United States Patent
Pinder

(10) Patent No.: US 10,635,275 B2
(45) Date of Patent: Apr. 28, 2020

(54) MULTI-DIMENSIONAL ZONE SELECTION METHOD IN A COMMUNICATION DEVICE

(71) Applicant: MOTOROLA SOLUTIONS, INC., Chicago, IL (US)

(72) Inventor: Ellis A. Pinder, Davie, FL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 174 days.

(21) Appl. No.: 15/481,612

(22) Filed: Apr. 7, 2017

(65) Prior Publication Data

US 2018/0292977 A1 Oct. 11, 2018

(51) Int. Cl.
*G06F 3/048* (2013.01)
*G06F 3/0484* (2013.01)
(Continued)

(52) U.S. Cl.
CPC .......... *G06F 3/04842* (2013.01); *G06F 1/169* (2013.01); *G06F 1/1626* (2013.01);
(Continued)

(58) Field of Classification Search
CPC ...... H04W 4/90; G06F 3/04842; G06F 3/016; G06F 3/0482; G06F 3/04883; G06F 3/167; G06F 3/0481; G06F 3/0488; G06F 17/2881; G06F 3/04815; G06F 16/27; G06F 16/3329; G06F 16/951; G06F 17/277; G06F 17/278; G06F 19/00; G06F 21/31; G06F 3/04817; G06F 3/0484; G06F 9/453; G06F 11/3466; G06F 13/4022; G06F 15/173; G06F 16/13; G06F 16/178; G06F 16/244; G06F 16/24568; G06F 16/24578; G06F 16/61; G06F 16/64; G06F 16/90324; G06F 16/904; G06F 16/955; G06F 17/20; G06F 17/241; G06F 17/243; G06F 17/248;
(Continued)

(56) References Cited

U.S. PATENT DOCUMENTS 5,767,852 A 6/1998 Keller et al.
5,852,780 A * 12/1998 Wang .................... H04W 16/04
455/450

(Continued)

*Primary Examiner* — Di Xiao
(74) *Attorney, Agent, or Firm* — Perry + Currier, Inc.

(57) ABSTRACT

A multi-dimensional zone selection method in a communication device is provided. The communication device comprises: a radio transceiver; a memory storing a plurality of zones arranged in a two-dimensional matrix, each of the plurality of zones indicative of a respective subset of one or more communication channels; an input interface; and, a controller. The controller is configured to: receive, using the input interface, navigation input to navigate the two-dimensional matrix to indicate a selected zone of the plurality of zones; receive, using the input interface, selection input indicating a selected communication channel of the respective subset of the one or more communication channels indicated within the selected zone; and cause the radio transceiver to communicate over the selected communication channel. In some implementations, the communication device further comprises an electronic display and the controller is further configured to control the electronic display to render the two-dimensional matrix.

14 Claims, 13 Drawing Sheets

(51) Int. Cl.
*H04W 72/02* (2009.01)
*G06F 3/0488* (2013.01)
*G06F 3/01* (2006.01)
*H04W 4/90* (2018.01)
*G06F 1/16* (2006.01)
*G06F 3/0362* (2013.01)

(52) U.S. Cl.
CPC ............ *G06F 3/016* (2013.01); *G06F 3/0362* (2013.01); *G06F 3/04883* (2013.01); *G06F 3/04886* (2013.01); *H04W 4/90* (2018.02); *H04W 72/02* (2013.01)

(58) Field of Classification Search
CPC .. G06F 17/2785; G06F 17/279; G06F 19/326; G06F 19/3418; G06F 19/3456; G06F 1/1626; G06F 1/169; G06F 1/3209; G06F 1/3215; G06F 1/3287; G06F 21/32; G06F 21/36; G06F 21/6218; G06F 21/6245; G06F 2221/2115; G06F 3/013; G06F 3/017; G06F 3/0362; G06F 3/048; G06F 3/04845; G06F 3/0485; G06F 3/0486; G06F 3/04886; G06F 3/1292; G06F 3/1462; G06F 3/165; G06F 8/61; G06F 8/77; G06F 9/445; G06F 9/455; G06F 9/54; G06F 9/547

See application file for complete search history.

(56) References Cited

U.S. PATENT DOCUMENTS

| | | | |
|---|---|---|---|
| 6,289,207 B1* | 9/2001 | Hudecek | H04B 1/205 455/150.1 |
| 6,817,027 B1* | 11/2004 | Curreri | H04N 5/44543 348/E5.105 |
| 8,330,033 B2 | 12/2012 | Lengeling et al. | |
| 8,798,609 B2 | 8/2014 | Jeon et al. | |
| 8,984,436 B1 | 3/2015 | Tseng et al. | |
| 2005/0003851 A1* | 1/2005 | Chrysochoos | G06F 3/03547 455/550.1 |
| 2010/0156809 A1* | 6/2010 | Nutaro | G06F 3/016 345/173 |
| 2015/0199012 A1 | 7/2015 | Palmer | |

* cited by examiner

FIG. 3

| ZONE 1A | ZONE 1B | ZONE 1C |
|---|---|---|
| CENTRAL STATION | MAIN HOSPITAL | HOSPITAL SOUTH |
| DISPATCH CENTER | FIRE DEPARTMENT | CENTRAL STATION |
| FIRE DEPARTMENT | MAYOR'S OFFICE | FIRE DEPARTMENT |

| ZONE 2A | ZONE 2B | ZONE 2C | ZONE 2D | ZONE 2E |
|---|---|---|---|---|
| NORTH FIRE | NORTH EMS | NORTH ANIMAL CONTROL | NORTH HOSPITAL | NORTH PD |
| EAST FIRE | EAST EMS | EAST ANIMAL CONTROL | EAST HOSPITAL | EAST PD |
| WEST FIRE | WEST EMS | WEST ANIMAL CONTROL | WEST HOSPITAL | WEST PD |
| SOUTH FIRE | SOUTH EMS | SOUTH ANIMAL CONTROL | SOUTH HOSPITAL | SOUTH PD |

| ZONE 3A | ZONE 3B | ZONE 3C |
|---|---|---|
| FAMILY SERVICES | FAMILY SERVICES-AFTER HOURS | FAMILY SERVICES |
| FAMILY SERVICES-AFTER HOURS | ANIMAL CONTROL-AFTER HOURS | DISPATCH CENTER |

| ZONE 4A | ZONE 4B | ZONE 4C | ZONE 4D |
|---|---|---|---|
| NORTH FIRE | SOUTH FIRE | EAST FIRE | WEST FIRE |
| NORTH EMS | SOUTH EMS | EAST EMS | WEST EMS |
| NORTH PD | SOUTH PD | EAST PD | WEST PD |
| NORTH HOSPITAL | SOUTH HOSPITAL | EAST HOSPITAL | WEST HOSPITAL |

| ZONE 5A | ZONE 5B | ZONE 5C | ZONE 5D | ZONE 5E |
|---|---|---|---|---|
| FAMILY SERVICES | MAIN HOSPITAL | DISPATCH CENTER | 911 | CENTRAL STATION |
| FIRE DEPARTMENT | MAIN EMS | 911 | PHONE COMPANY | DISPATCH CENTER |
| MAIN HOSPITAL | | | | FIRE DEPARTMENT |

203

MULTI-DIMENSIONAL ZONE SELECTION METHOD IN A COMMUNICATION DEVICE

BACKGROUND OF THE INVENTION

In communication devices, physical and/or displayed interfaces are used to select a communication channel from a group of communication channels, for example in communication devices used by emergency responders. In some such communication devices, multiple groups of communication channels are provided which can correspond to groups of communication channels for different types of emergency services. Such groups are referred to as zones. For example, one zone of communication channels can be used to communicate with fire services, while another zone of communication channels can be used to communicate with ambulance services. Selecting a zone of communication channels can be performed using a toggle switch, or simply scrolling through a list of zones at a display, however such techniques are slow, and can lead to errors in zone selection especially in emergency situations, especially when there are many zones from which to select.

Accordingly, there is a need for a multi-dimensional zone selection method in a communication device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate implementations of concepts that include the claimed invention, and explain various principles and advantages of those implementations.

FIG. 3 is an example of a two-dimensional matrix of zones in accordance with some implementations.

Figure 1:
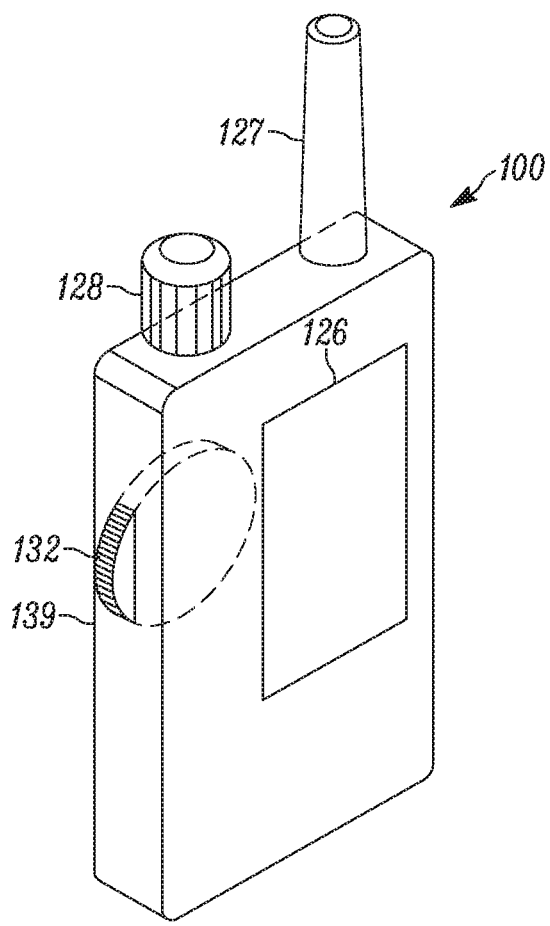
FIG. 1 is a perspective view of a communication device for multi-dimensional zone selection in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present invention.

The apparatus and method components have been represented where appropriate by conventional symbols in the drawings, showing only those specific details that are pertinent to understanding the implementations of the present invention so as not to obscure the disclosure with details that will be readily apparent to those of ordinary skill in the art having the benefit of the description herein.

DETAILED DESCRIPTION

An aspect of the specification provides a communication device comprising: a radio transceiver; an electronic display; an input interface; and a controller communicatively coupled to the radio transceiver, the electronic display, and the input interface, the controller configured to: control the electronic display to render a plurality of zones arranged in a two-dimensional matrix, each of the plurality of zones indicative of a respective subset of one or more communication channels; receive, using the input interface, navigational input indicating a selected zone of the plurality of zones; receive, using the input interface, selection input indicating a selected communication channel of the respective subset of the one or more communication channels indicated within the selected zone; and cause the radio transceiver to communicate over the selected communication channel.

Another aspect of the specification provides a method comprising: at communication device comprising: a radio transceiver; an electronic display; an input interface; and a controller communicatively coupled to the radio transceiver, electronic display, and input interface, controlling, using the controller, the electronic display to render a plurality of zones arranged in a two-dimensional matrix, each of the plurality of zones indicative of a respective subset of one or more communication channels; receiving, at the controller, using the input interface, navigational input indicating a selected zone of the plurality of zones; receiving, at the controller, using the input interface, selection input indicating a selected communication channel of the respective subset of the one or more communication channels indicated within the selected zone; and causing, using the controller, the radio transceiver to communicate over the selected communication channel.

A further aspect of the specification provides a communication device comprising: a radio transceiver; a memory storing a plurality of zones arranged in a two-dimensional matrix, each of the plurality of zones indicative of a respective subset of one or more communication channels; an input interface; and, a controller configured to: receive, using the input interface, navigation input to navigate the two-dimensional matrix to indicate a selected zone of the plurality of zones; receive, using the input interface, selection input indicating a selected communication channel of the respective subset of the one or more communication channels indicated within the selected zone; and cause the radio transceiver to communicate over the selected communication channel.

Yet a further aspect of the specification provides a method comprising: at a communication device comprising: radio transceiver; a memory storing a plurality of zones arranged in a two-dimensional matrix, each of the plurality of zones indicative of a respective subset of one or more communication channels; an input interface; and, a controller, receiving, at the controller, using the input interface, navigation input to navigate the two-dimensional matrix to indicate a selected zone of the plurality of zones; receiving, at the controller, using the input interface, selection input indicating a selected communication channel of the respective subset of the one or more communication channels indicated within the selected zone; and causing, using the controller, the radio transceiver to communicate over the selected communication channel.

Figure 2:
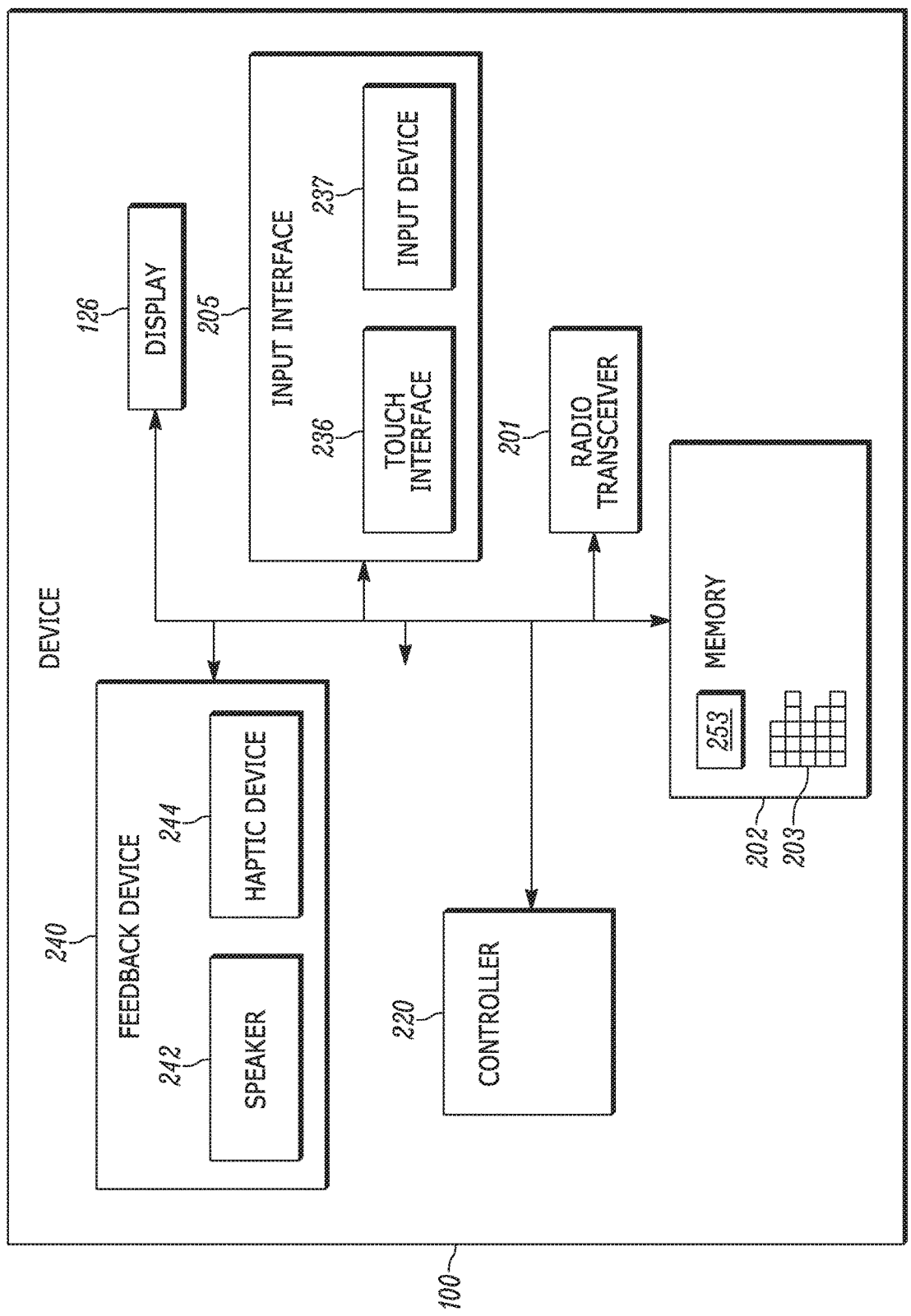
FIG. 2 is a schematic view of the device of FIG. 1 in accordance with some implementations.

Attention is directed to FIG. 1, which depicts a perspective view of a communication device 100, interchangeably referred to hereafter as the device 100 and FIG. 2 which depicts a schematic block diagram of the device 100. With reference to FIG. 1, the device 100 includes an electronic display 126 (interchangeably referred to hereafter as the display 126), an antenna 127 for communicating radio signals, one or more auxiliary controls 128, and an optional button and/or wheel 132 used to select a communication channel, as described in more detail below; in general, however, the wheel 132 comprises a rotary knob and/or rotary wheel that includes a digital encoder such that when rotational input is received at the wheel 132, the wheel 132 is usable to select a communication channel. However, in other implementations, one or more auxiliary controls 128 comprises a knob used to select a communication channel. It is furthermore understood that the components depicted in FIG. 1 are housed by and/or integrated with an external housing 139 of the device 100. Hence, the components of the device 100 as depicted in FIG. 1 are accessible to, and/or visible to, a user of the device 100.

With reference to FIG. 2, the device 100 further comprises: a radio transceiver 201; a memory 202 storing a plurality of zones arranged in a two-dimensional matrix 203, each of the plurality of zones indicative of a respective subset of one or more communication channels; an input interface 205; and, a controller 220 configured to: receive, using the input interface 205, navigational input to navigate the two-dimensional matrix 203 to indicate a selected zone of the plurality of zones; receive, using the input interface, selection input indicating a selected communication channel of the respective subset of one or more communication channels indicated within the selected zone; and cause the radio transceiver 201 to communicate over the selected communication channel. In general, the controller 220 is communicatively coupled to the radio transceiver 201, the electronic display 126, and the input interface 205.

The display 126 comprises any suitable one of, or combination of, flat panel displays (e.g. LCD (liquid crystal display), plasma displays, OLED (organic light emitting diode) displays) and the like, as well as one or more optional touch screens (including capacitive touchscreens and/or resistive touchscreens). Hence, in some implementations, the display 126 comprises a touch electronic display.

As depicted in FIG. 2, the input interface 205 comprises one or more of a touch interface 236 and an input device 237, used to receive the navigational input, as described in more detail below. For example, in the depicted implementations, the electronic display 126 comprises a touch electronic display, and the touch interface 236 comprises a touch input portion of the electronic display 126; indeed, while touch interface 236 and the electronic display 126 are depicted as being separate from each other in FIG. 2, their operation is coordinated using the controller 220.

Furthermore, in the depicted implementations, the input device 237 comprises one or more auxiliary controls, for example, auxiliary control 128 as shown in FIG. 1, which comprises one or more of a button and a joystick configured to receive navigational input. In yet further implementations, the input device 237 includes, but is not limited to, a keyboard, a joystick, a touch pad, one or more buttons (including but not limited to wheel 132), one or more actuators, and the like.

As also depicted in FIG. 2, the device 100 comprises a feedback device 240 configured to provide feedback during navigation of the two-dimensional matrix 203 in response to one or more of: changing zones; a selected zone being selected; and reaching an edge of the two-dimensional matrix 203. Alternatively, such feedback is provided by the electronic display 126. In particular, as depicted, the feedback device 240 comprises one or more of a speaker 242 and a haptic device 244. For example, in the depicted implementations, one or more of the speaker 242 and the haptic device 244 is controlled by the controller 220 to provide sound and/or haptic (e.g. vibration) feedback during navigation of the two-dimensional matrix 203 in response to one or more of: changing zones; a selected zone being selected; and reaching an edge of the two-dimensional matrix 203. In yet further implementations, the haptic device 244 is controlled to provide haptic feedback during navigation of the two-dimensional matrix 203 in response to reaching a last respective zone of one or more of a row and a column of the two-dimensional matrix 203. Navigation of the two-dimensional matrix 203 is described in further detail below. Indeed, through the use of aural feedback and/or haptic feedback eyes-free operation of the device 100 can occur such that in some implementations, the display 126 is optional and/or use of the display 126 is optional.

While not depicted, in some implementations, the device 100 include a battery that includes, but is not limited to, a rechargeable battery, a power pack, and/or a rechargeable power pack. However, in other implementations, the device 100 is incorporated into a vehicle and/or a system that includes a battery and/or power source, and the like, and power for the device 100 is provided by the battery and/or power system of the vehicle and/or system; in other words, in such implementations, the device 100 need not include an internal battery.

In yet further implementations, the device 100 includes additional or alternative components related to, for example, telephony, messaging, entertainment, and/or any other components that may be used with a communication device.

Hence, the device 100 generally comprises a mobile device which includes, but is not limited to, any suitable combination of electronic devices, communication devices, computing devices, portable electronic devices, mobile computing devices, portable computing devices, tablet computing devices, telephones, PDAs (personal digital assistants), cellphones, smartphones, e-readers, mobile camera devices and the like. Other suitable devices are within the scope of present implementations.

In some implementations, the device 100 is specifically adapted for emergency service radio functionality, and the like, used by emergency responders and/or first responders, including, but not limited to, police service responders, fire service responders, emergency medical service responders, and the like. In some of these implementations, the device 100 further includes other types of hardware for emergency service radio functionality, including, but not limited to, push-to-talk ("PTT") functionality; for example, in some implementations, the radio transceiver 201 is adapted for push-to-talk functionality. However, other devices are within the scope of present implementations.

In particular, the radio transceiver 201 is generally configured to wirelessly communicate using one or more communication channels, the radio transceiver 201 being implemented by, for example, one or more radios and/or connectors and/or network adaptors, configured to communicate wirelessly, using the antenna 127, with network architecture that is used to implement one or more communication channels between other devices and/or a wireless network. The radio transceiver 201 can include, but is not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver operating in accordance with an IEEE 802.16 standard, and/or other similar type of wireless transceiver configurable to communicate via a wireless network for infrastructure communications. In yet further implementations, the radio transceiver 201 includes one or more local area network or personal area network transceivers operating in accordance with an IEEE 802.11 standard (e.g., 802.11a, 802.11b, 802.11g), or a Bluetooth transceiver. In some implementations, the radio transceiver 201 is further configured to communicate "radio-to-radio" on some communication channels, while other communication channels are configured to use wireless network infrastructure.

Example communication channels over which the radio transceiver 201 is generally configured to wirelessly communicate include, but are not limited to, one or more of wireless channels, cell-phone channels, cellular network channels, packet-based channels, analog network channels, Voice-Over-Internet ("VoIP"), push-to-talk channels and the like, and/or a combination.

Indeed, the term "channel" and/or "communication channel", as used herein, includes, but is not limited to, a physical radio-frequency (RF) communication channel, a logical radio-frequency communication channel, a trunking talkgroup (interchangeably referred to herein a "talkgroup"), a trunking announcement group, a VOIP communication path, a push-to-talk channel, and the like.

The controller 220 of FIG. 2 includes one or more logic circuits configured to implement multi-dimensional zone selection functionality of the device 100. Example logic circuits include one or more processors, one or more microprocessors, one or more ASIC (application-specific integrated circuits) and one or more FPGA (field-programmable gate arrays). In some implementations, the controller 220 and/or the device 100 is not a generic controller and/or a generic communication device, but a communication device specifically configured to implement multi-dimensional zone selection functionality. For example, in some implementations, the device 100 and/or the controller 220 specifically comprises a computer executable engine configured to implement specific multi-dimensional zone selection functionality.

The memory 202 of FIG. 2 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random access memory ("RAM")). In the implementation of FIG. 2, programming instructions (e.g., machine readable instructions) that implement the functional teachings of the device 100 as described herein are maintained, persistently, at the memory 202 and used by the controller 220 which makes appropriate utilization of volatile storage during the execution of such programming instructions.

In particular, the memory 202 of FIG. 2 stores instructions corresponding to an application 253 that, when executed by the controller 220, enables the controller 220 to implement specific multi-dimensional zone selection functionality associated with the application 253. In the illustrated example, when the controller 220 executes the application 253, the controller 220 is enabled to: receive, using the input interface 205, navigational input to navigate the two-dimensional matrix 203 to indicate a selected zone of the plurality of zones; receive, using the input interface, selection input indicating a selected communication channel of the respective subset of the one or more communication channels indicated within the selected zone; and cause the radio transceiver 201 to communicate over the selected communication channel.

Attention is next directed to FIG. 3, which depicts details of the plurality of zones arranged in the two-dimensional matrix 203 as stored at the memory 202. As depicted, the two-dimensional matrix 203 is arranged in rows and columns, with an intersection of a row and a column corresponding to a zone of communication channels. As depicted, the two-dimensional matrix 203 comprises rows of varying lengths, and in particular five rows of varying lengths. However, in other implementations, the two-dimensional matrix 203 can comprise fewer than five rows or more than five rows, and further the rows can be of the same length or varying lengths. In alternative implementations, the two-dimensional matrix 203 comprises columns of the same length or varying lengths.

Indeed, at a minimum, the two-dimensional matrix 203 comprises two rows, with at least one of the two rows having two columns, or the two-dimensional matrix 203 comprises two columns, with at least one of the two columns having two rows. In other words, the two-dimensional matrix 203 comprises a "n×m" matrix, where n and m represent a number of rows and a number of columns (or vice versa) of the matrix, with each of n and m being integers, and each of n and m being at least "2". Hence, for example, the two-dimensional matrix 203 comprises at least a 2×2 matrix of four zones, with at least three of the zones in the 2×2 configuration being indicative of a respective subset of one or more communication channels. Hence, for example, in such a 2×2 matrix, one of the zones may not be indicative of a respective subset of one or more communication channels. Such a matrix can also be described as a matrix with two rows, the first row having one column and the second row having two columns, and the like. Such a matrix can also be referred to, in other implementations, as a multi-dimensional matrix.

Furthermore, the size and/or shape of the two-dimensional matrix 203 is configurable, for example by a user of the device 100.

As depicted in the example of FIG. 3, for clarity, each zone of the two-dimensional matrix 203 is numbered according to each of a row position and a column position in the two-dimensional matrix 203, with rows numbered from top to bottom starting at the number "1", and columns lettered from left to right, starting with the letter "A". Hence, "Zone 1A" is in the first row and the first column, "Zone 1B" is in the first row and the second column, etc. However, in other implementations, one or more of the zone of the two-dimensional matrix 203 is provided with one or more of an alphanumeric name that does not include a numbering scheme.

Furthermore, each zone of the two-dimensional matrix 203 is further indicative of a respective subset of one or more communication channels. As described above, the device 100 is generally configured to communicate using one or more communication channels, which are indicated in FIG. 3 using textual labels. In particular, in the depicted implementations, the device 100 and/or the radio transceiver 201, is configured to communicate using a plurality of communication channels. As depicted, such example communication channels include, but are not limited to: "Central Station", "Dispatch Center", "Fire Department", "North Fire", "East Fire", "South Fire", "West Fire", "North EMS", "East EMS", "South EMS", "West EMS", "North PD", "East PD", "South PD", "West PD" (EMS indicating "Emergency Medical Services", such as ambulance services, and the like, and PD indicating "Police Department"), etc. Indeed, each of the indicated communication channels can comprise a corresponding talkgroup.

As depicted, three communication channels are associated with Zone 1A: "Central Station", "Dispatch Center", "Fire Department". Similarly, four communication channels are associated with Zone 2A: "North Fire", "East Fire", "West Fire" and "South Fire". Indeed, each zone depicted is associated with a subset of the one or more communication channels. Further, each zone can include one or more communication channels that are also associated with another zone. Furthermore, some zones (such as Zone 1A and Zone 5E) can be associated with the same respective subset of the one or more communication channels. Furthermore, a respective subset associated with each zone is configurable, for example by a user of the device 100. In some of these configurations, zones in rows and/or columns can be grouped by categories. For example, each zone in the second row and the fourth row of the two-dimensional matrix 203 indicates respective communication channels of different emergency services arranged geographically according to two different schemes. In alternative implementations, the zones of the two-dimensional matrix 203 are grouped by geographic area (for example in the fourth row of the two-dimensional matrix 203).

It is further appreciated that, in some implementations, the order of each respective subset of the one or more communication channels in each of the zones of the two-dimensional matrix 203 represents an order that the respective channels are provided during a selection of the channels.

Hence, as will be described below, the input interface 205 is first used to navigate the two-dimensional matrix 203 to select a zone, and the input interface 205 is used to select one of the respective channels in the selected zone.

Figure 4:
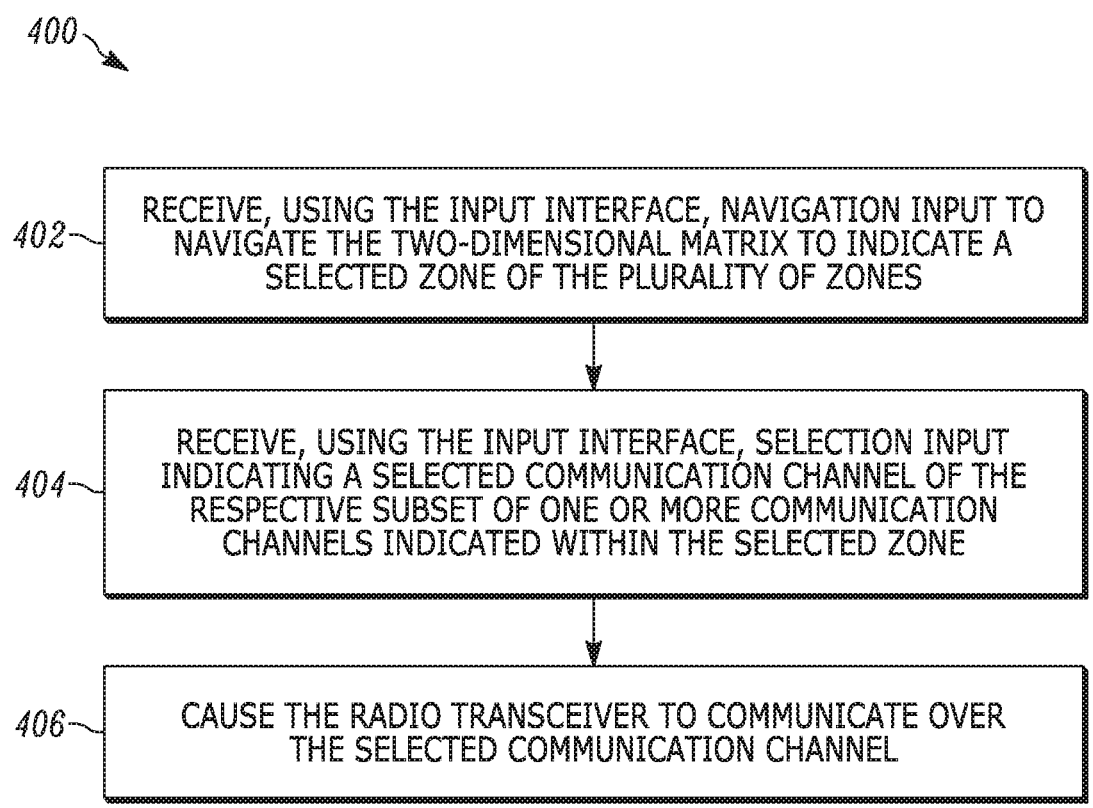
FIG. 4 is a flowchart of a method for multi-dimensional zone selection in accordance with some implementations.

Attention is now directed to FIG. 4 which depicts a flowchart representative of a method 400 for multi-dimensional zone selection of the device 100. The operations of the method 400 of FIG. 4 correspond to machine readable instructions that are executed by, for example, the device 100 of FIG. 2, and specifically by the controller 220 of the device 100. In the illustrated example, the instructions represented by the blocks of FIG. 4 are stored at the memory 202, for example, as the application 253. The method 400 of FIG. 4 is one way in which the controller 220 and/or the device 100 is configured. Furthermore, the following discussion of the method 400 of FIG. 4 will lead to a further understanding of the device 100, and its various components. However, it is to be understood that the device 100 and/or the method 400 may be varied, and need not work exactly as discussed herein in conjunction with each other, and that such variations are within the scope of present implementations.

The method 400 of FIG. 4 need not be performed in the exact sequence as shown and likewise various blocks may be performed in parallel rather than in sequence. Accordingly, the elements of method 400 are referred to herein as "blocks" rather than "steps." The method 400 of FIG. 4 may be implemented on variations of the device 100 of FIG. 2, as well.

At block 402, the controller 220 receives, using the input interface 205, navigational input to navigate the two-dimensional matrix 203 to indicate a selected zone of the plurality of zones.

At block 404, the controller 220 receives, using the input interface, selection input indicating a selected communication channel of the respective subset of the one or more communication channels indicated within the selected zone.

At block 406, the controller 220 causes the radio transceiver 201 to communicate over the selected communication channel.

Furthermore, while the method 400 is described with reference a zone to be selected prior to a communication channel, in other implementations, the zone selection and communication channel selection can occur independently. Hence, for example, a zone can be selected without channel selection (e.g. communication channel doesn't change).

The method 400 will now be described with reference to FIG. 5 to FIG. 10. Each of FIG. 5 to FIG. 10 are each substantially similar to one another, with like elements having like numbers, with each of FIG. 5 to FIG. 10 depicting a front perspective view of the device 100. In particular, each of FIG. 5 to FIG. 10 depict a circular arrangement 501 of a respective subset of the one or more communication channels for a selected zone, and an interior 503 (labelled "PTT" in each of FIG. 5 to FIG. 10) of the circular arrangement 501 is configured to receive a press input to indicate a selected communication channel. Indeed, receipt of such press input in the interior 503 further initiates communications (and/or a transmission) using the radio transceiver 201 over the selected communication channel. Indeed, in the depicted example implementations, the circular arrangement 501 is rendered at the display 126 when the device 100 is being operated in a radio mode.

Furthermore, FIG. 5 to FIG. 10 depicts a sequence at the device 100 in which navigation from Zone 1A to Zone 2E occurs, and then a communication channel "East PD" of Zone 2E is selected.

Figure 5:
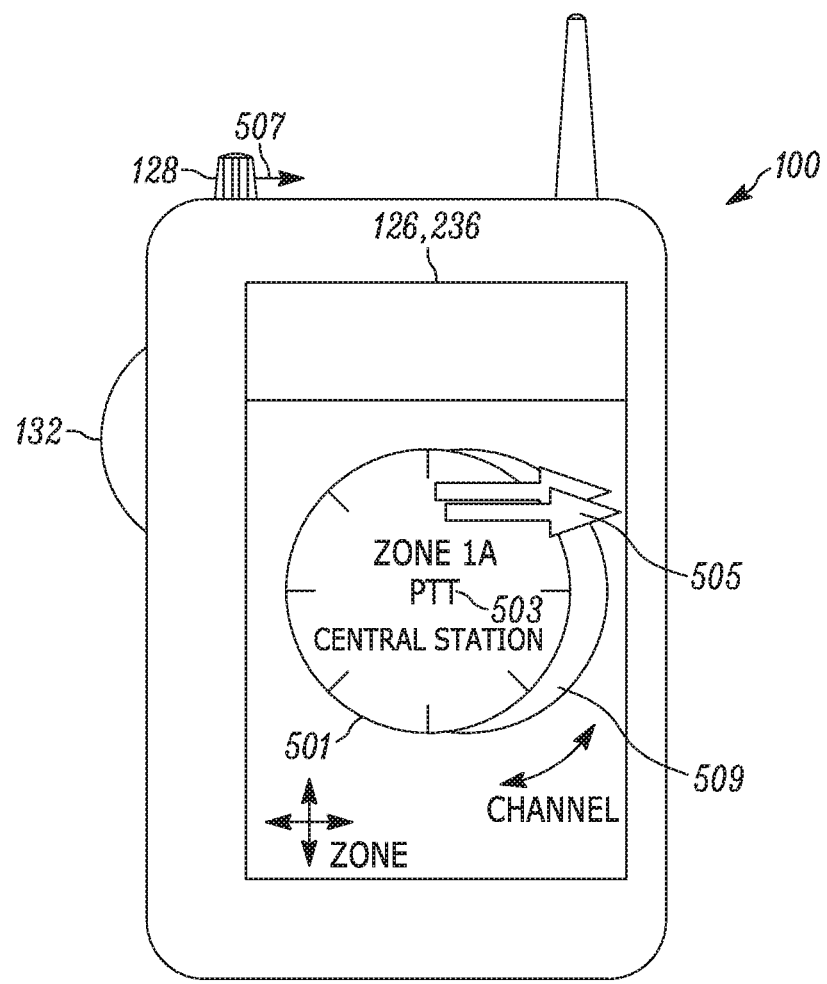
FIG. 5 is a front perspective view of the device of FIG. 1 during implementation of multi-dimensional zone selection, and showing navigation of the two-dimensional matrix from a first zone to an adjacent zone, in accordance with some implementations.

Attention is hence first directed to FIG. 5 which depicts a mode of the device 100, as the method 400 is initiated. In the depicted implementation, the electronic display 126 is configured to render a representation of a selected zone, for example, using a textual indication thereof. For example, Zone 1A is initially indicated at the display 126 (e.g. via text "Zone 1A") as being a selected zone and/or a zone from which a respective communication channel can be selected; and hence one of the respective communication channels "Central Station", "Dispatch Center", and "Fire Department" of Zone 1A (e.g. as depicted in FIG. 2) is selectable using the circular arrangement 501 and the interior 503 of the circular arrangement 501. In particular, a textual indication of a first communication channel, "Central Station" associated with Zone 1A is depicted at the display 126. As will be described below, further communications channels associated with Zone 1A are selectable upon receipt of rotational input at the circular arrangement 501, with initiation of a transmission over a selected communication occurring, for example by receiving a press input at the interior 503. As rotational input at the circular arrangement 501 is received, scrolling through the communication channels associated with Zone 1A occurs, with a textual indication of each communication channel being provided at the display 126, for example in the interior 503. Hence, in the depicted implementations, not all of the available communications associated with a selected zone are depicted. While as depicted, the first communication channel of Zone 1A is initially available for selection, in other implementations, a last selected communication channel for Zone 1A is stored at the memory 202, and when navigation to Zone 1A occurs, and/or when the device is powered on and/or reset, the last selected communication channel is initially available for selection.

Other implementations of the interface depicted at the display 126 are within the scope of the present specification. For example, in some implementations, the textual indications of all respective communication channels associated with a selected zone are provided at the display 126, for example arranged around the outside edge of the circular arrangement 501.

Assuming that a communication channel from Zone 2E is to be selected, navigation to Zone 2E is described hereafter. In particular, as depicted in FIG. 5, navigational input 505 is received (e.g. at block 402 of method 400) at the touch interface 236 to navigate the two-dimensional matrix 203 to indicate a selected zone of the plurality of zones. In particular, the navigational input 505 comprises a touch input at the touch interface 236 and, in particular, a plurality of touch inputs, such as a double-swipe touch input at the touch interface 236 (e.g. with two swipe touch inputs being received, one after the other, and within a given time period, for example within about a second). Such a double-swipe touch input received as a navigational touch input for navigating the two-dimensional matrix 203 can reduce the possibility of a touch input received at the touch interface 236 causing erroneous or inadvertent navigation of the two-dimensional matrix 203. Furthermore, in some implementations, the navigational input 505 is receivable at any position at the touch interface 236 including, but not limited to one or more of the circular arrangement 501 and/or the interior 503. Indeed, when the navigational input 505 is received at the interior, the device 100 is in zone selection mode such that the navigational input 505 does not cause channel selection.

In particular, the navigational input 505 comprises one or more swipe inputs in one or more of a horizontal, vertical, and diagonal direction that indicates a direction of navigation within the two-dimensional matrix 203 to indicate a selected zone. As depicted, the navigational input 505 comprises a right swipe input in a horizontal direction, relative to the display 126.

Alternatively, as also depicted in FIG. 5, navigational input 507 is received at the button and/or joystick of the one or more auxiliary controls 128 to navigate the two-dimensional matrix 203 to indicate a selected zone of the plurality of zones. In particular, the navigational input 507 comprises pressure received at the one or more auxiliary controls 128, the pressure received in a direction of navigation relative to the display 126. Generally, either the navigational input 505 is received, or the navigational input 507 is received to navigate the two-dimensional matrix 203.

However, navigation of the two-dimensional matrix 203 can occur only with the navigational input 505, only with the navigational input 507, or with both of the navigational input 505 and the navigational input 507. Furthermore, when one or more auxiliary controls 128 is not enabled for receipt of the navigational input 507, navigation of the two-dimensional matrix 203 occurs only with receipt of the navigational input 505. Similarly, when the display 126 is not enabled for receipt of the navigational input 505, navigation of the two-dimensional matrix 203 occurs only with receipt of the navigational input 507. In yet further implementations, the input interface 205 and/or the touch interface 236 and/or the controller 220 is configured to detect the presence of water on the touch interface 236, for example by detecting touch input at the touch interface 236 that corresponds to water droplets. The presence of water at the touch interface 236 can make detection of navigational input 505 difficult and/or unreliable; accordingly, in some of these implementations, the controller 220 is configured to temporarily disable the touch interface 236 thus requiring zone navigation to be performed using navigational input 507. In some of these implementations, the controller 220 can further control the display 126 and/or the feedback device 240 to provide an alert and/or a notification of water being at the touch interface 236. Furthermore, in some implementations, when water is no longer detected at the touch interface 236, the controller 220 enables the touch interface 236.

Furthermore, in some implementations, as depicted, the display 126 is controlled to render a temporary displacement 509 of the circular arrangement 501 in a direction of navigation. As depicted, the temporary displacement 509 comprises a graphical indication of a movement of an edge of the circular arrangement 501 in a direction of navigation; however, in other implementations, the temporary displacement 509 comprises a displacement of the entirety of the circular arrangement 501.

As depicted, as each the navigational input 505 and the navigational input 507 is in a rightward direction relative to the display 126, the temporary displacement 509 is also in a rightward direction. Either way, the direction of temporary displacement 509 relative to the display 126 and/or the direction of the navigational input 505 (and/or the navigational input 507) relative to the display 126 indicates a direction of navigation of the two-dimensional matrix 203.

Furthermore, as will be described with reference to FIG. 6, each of the navigational input 505 and the navigational input 507 is indicative of navigation to Zone 1B (e.g. the zone to the right of Zone 1A, the currently selected zone and/or the currently rendered zone).

If is further appreciated that, in some implementations, the device 100 enters the mode depicted in FIG. 5 upon receipt of the navigational input 505 or the navigational input 507. In other words, in some implementations, a double-swipe at the touch interface 236 (or pressure at the one or more auxiliary controls, e.g. above a threshold pressure) causes the controller 220 to: upon receipt of the navigational input 505 (or the navigational input 507 being above a threshold pressure), control the electronic display 126 to render the circular arrangement 501, which, as depicted, includes a textual indication of one of the communication channels of the respective subset of the one or more communication channels associated with the selected zone, the interior 503 of the circular arrangement 501 configured to receive a press input to indicate a selected communication channel. Indeed, in some implementations, a selection of a communication channel occurs by receiving rotational input at the circular arrangement 501 within, for example, a timeout period and/or by receiving a given touch input sequence within a timeout period and/or a within a given time period. Furthermore, in some implementations, the device 100 is generally configured to indicate that it is in a zone selection mode or a communication channel selection mode, with similar touch input received in each mode used to navigate the two-dimensional matrix 203 or select a communication channel or select another type of radio operation mode (e.g. different from the depicted push-to-talk mode).

Figure 6:
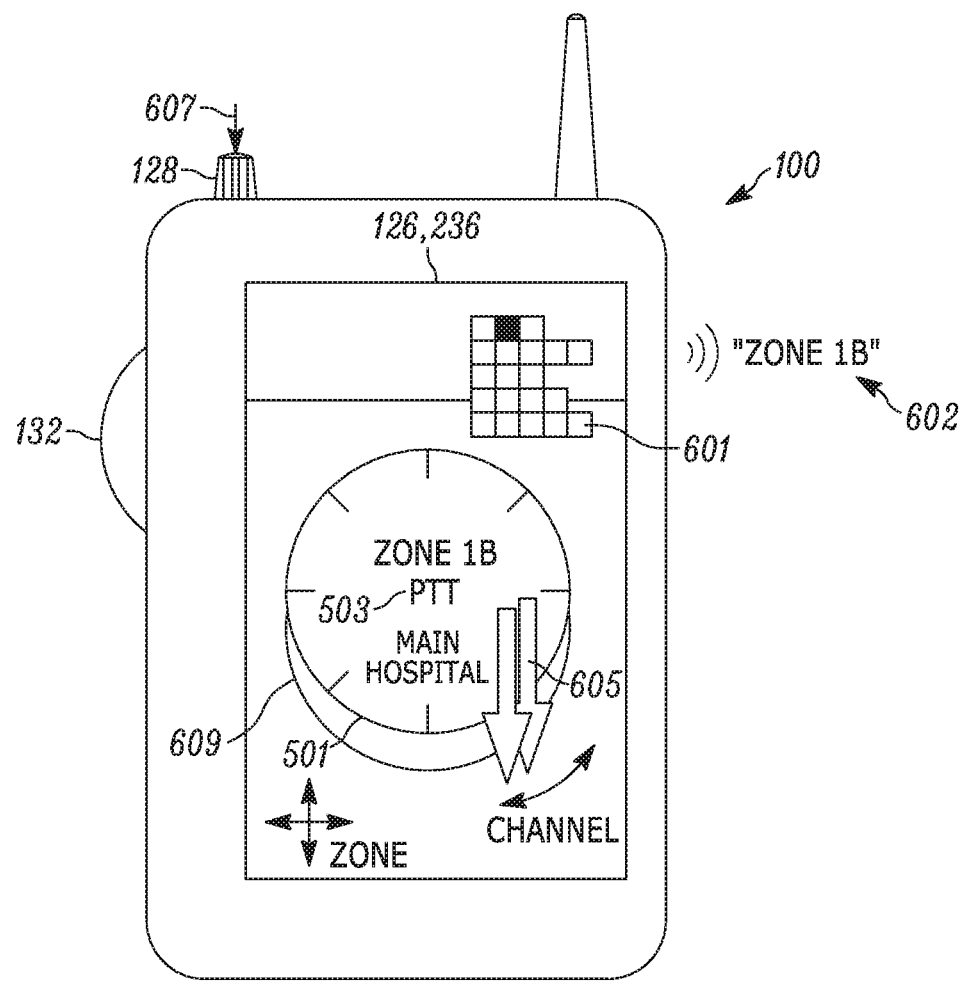
FIG. 6 is a front perspective view of the device of FIG. 1 during further implementation of multi-dimensional zone selection as well as navigation to a last zone in a row, in accordance with some implementations.

Attention is next directed to FIG. 6 which depicts the device 100 after receipt of the navigational input 505 or the navigational input 507 and/or after navigation to Zone 1B occurs (e.g. upon receipt of the navigational input 505 or the navigational input 507).

In particular, Zone 1B is indicated at the display 126 as being a selected zone and/or a zone from which a respective communication channel can be selected; and hence specifically one of the respective subset of communication channels is selectable using the circular arrangement 501 and the interior 503 of the circular arrangement 501.

Furthermore, while a textual indication of the first communication channel associated with Zone 1B is depicted, in other implementations, a textual indication of a last selected communication channel associated with Zone 1B is rendered at the display 126 (e.g. a last selected channel of Zone 1B when Zone 1B was last a selected zone). Furthermore, communication channel selection is generally independent of zone selection. For example, in some implementations, when a third channel of a given zone has been selected, and navigation to a next zone communication channels occurs, then the third communication channel of the next zone is the associated communication of the next zone that is initially available for selection. In other words, in FIG. 5 and FIG. 6, as the first communication channel of Zone 1A was available for selection when navigation to Zone 1B occurs, the communication channel initially available for selection in Zone 1B is also the first communication channel of Zone 1B. However, when the next zone does not include an analogous communication channel (e.g. a fourth communication channel of a current zone is selected and navigation to a next zone having only three communication channels occurs), then either a notification and/or an alert is generated at the device 100, and/or a first communication channel or a last communication channels is selected and/or made available for selection upon receipt of selection input. However, in some implementations, navigation between zones of communication channels can include automatic selection of a communication channel in a next zone and/or a current zone and/or a selected zone, though in other implementations switching communication channels occurs upon receipt of selection input.

Furthermore, in contrast to FIG. 5, the controller 220 is controlling the electronic display 126 to render the plurality of zones arranged in the two-dimensional matrix 203, for example as a representation 601 of the two-dimensional matrix 203. The representation 601 generally comprises a thumbnail view of the two-dimensional matrix 203, with an area corresponding to a selected zone being rendered differently from other areas of the representation 601. For example, as depicted, the area of the representation 601 corresponding to selected Zone 1B is rendered differently from the other zones. In particular, the area of the representation 601 corresponding to Zone 1B is black, while the remaining areas are white, however other schemes for differently rendering a selected zone in the representation 601 is within the scope of present implementations including, but not limited to different shading, and the like.

Regardless, in the depicted implementations, the controller 220 is further configured to render the representation 601 of the two-dimensional matrix 203 and a position of a selected zone in the two-dimensional matrix 203.

FIG. 6 also depicts implementations where the feedback device 240 is controlled to provide feedback during navigation of the two-dimensional matrix 203 in response to one or more of: changing zones; and a selected zone being selected. For example, as depicted, aural feedback 602 is provided using the speaker 242 to indicate a selected zone. In other words, as Zone 1B is a currently selected zone, the speaker 242 is controlled to emit the phrase "Zone 1B". Alternatively, the haptic device 244 is controlled to cause the device 100 to vibrate according to a pattern that indicates one or more of changing zones; and a selected zone being selected.

FIG. 6 depicts additional navigational input 605 being received at the touch interface 236 (e.g. at block 402 of method 400) to navigate the two-dimensional matrix 203 to further indicate a selected zone of the plurality of zones. In particular, the navigational input 605 is similar to the navigational input 505, but in a downward vertical direction, relative to the display 126, indicating navigation to the zone in the next row, below Zone 1B, and in particular Zone 2B. Alternatively, navigational input 607 is received, similar to navigational input 505, but indicative of navigation in a downward vertical direction, relative to the display 126. Furthermore, as depicted, the display 126 is controlled to render a temporary displacement 609 of the circular arrangement 501 in a direction of the navigation, similar to the temporary displacement 509.

Figure 7:
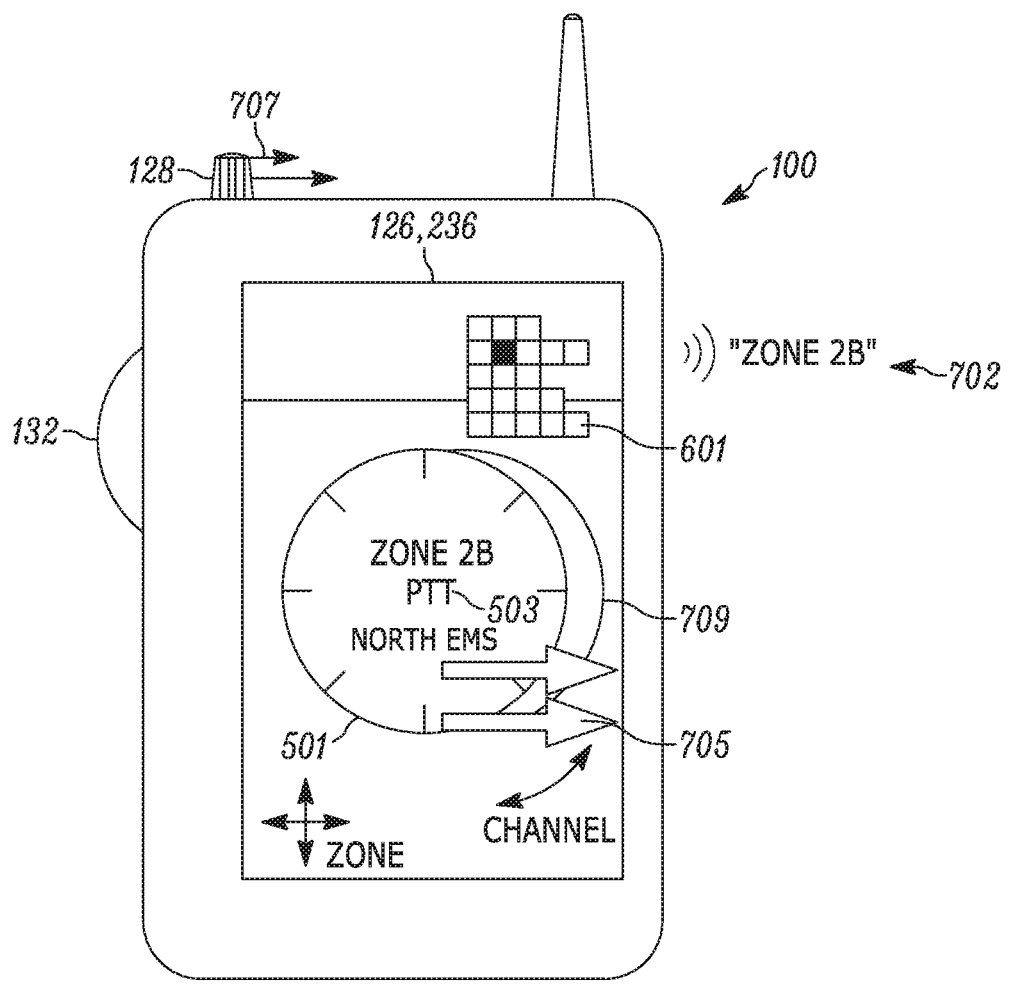
FIG. 7 is a front perspective view of the device of FIG. 1 during further implementation of multi-dimensional zone selection, and showing navigation to a last zone in a row, in accordance with some implementations.

Attention is next directed to FIG. 7 which depicts the device 100 after receipt of the receipt of the navigational input 605 or the navigational input 607 and/or after navigation to Zone 2B occurs (e.g. upon receipt of the navigational input 605 or the navigational input 607).

In particular, Zone 2B is indicated at the display 126 as being a selected zone and/or a zone from which a respective communication channel can be selected; and hence specifically one of the respective subset of communication channels is selectable using the circular arrangement 501 and the interior 503 of the circular arrangement 501. Furthermore, the area of the representation 601 of the two-dimensional matrix 203 corresponding to Zone 2B is black, while the remaining areas are white. As navigation to Zone 2B has occurred, aural feedback 702 is provided indicating "Zone 2B".

Furthermore, FIG. 7 depicts additional navigational input 705 being received at the touch interface 236 (e.g. at block 402 of method 400) at the touch interface 236 to navigate the two-dimensional matrix 203 to further indicate a selected zone of the plurality of zones. In particular, the navigational input 705 comprises touch input indicative of navigation to a last respective zone of one or more of a row and a column of the two-dimensional matrix 203, and in particular a last respective zone of the current row of the two-dimensional matrix 203. Put another way, the navigational input 705 comprises touch input indicative of navigation to an edge of the two-dimensional matrix 203.

For example, in some implementations, the navigational input 705 comprises two-finger swipe input and/or two swipe inputs received simultaneously. In particular, the navigational input 705 is in a rightward horizontal direction, relative to the display 126, indicating navigation to the last zone in the current row and/or a zone at the edge of the two-dimensional matrix 203 in the current row: Zone 2E.

Alternatively, navigational input 707 is received at the one or more auxiliary controls 128, similar to navigational input 605, but indicative of indicative of navigation to a last respective zone of one or more of a row and a column of the two-dimensional matrix 203, and in particular a last respective zone of the current row of the two-dimensional matrix 203: Zone 1B. Put another way, the navigational input 707 comprises input indicative of navigation to an edge of the two-dimensional matrix 203 in the current row.

As depicted, navigational input 707 comprises pressure, received twice at the one or more auxiliary controls 128 within a given time period (for example, within about a second, and the like).

Furthermore, as depicted, the display 126 is controlled to render a temporary displacement 709 of the circular arrangement 501 in a direction of the navigation, similar to the temporary displacement 609.

Figure 8:
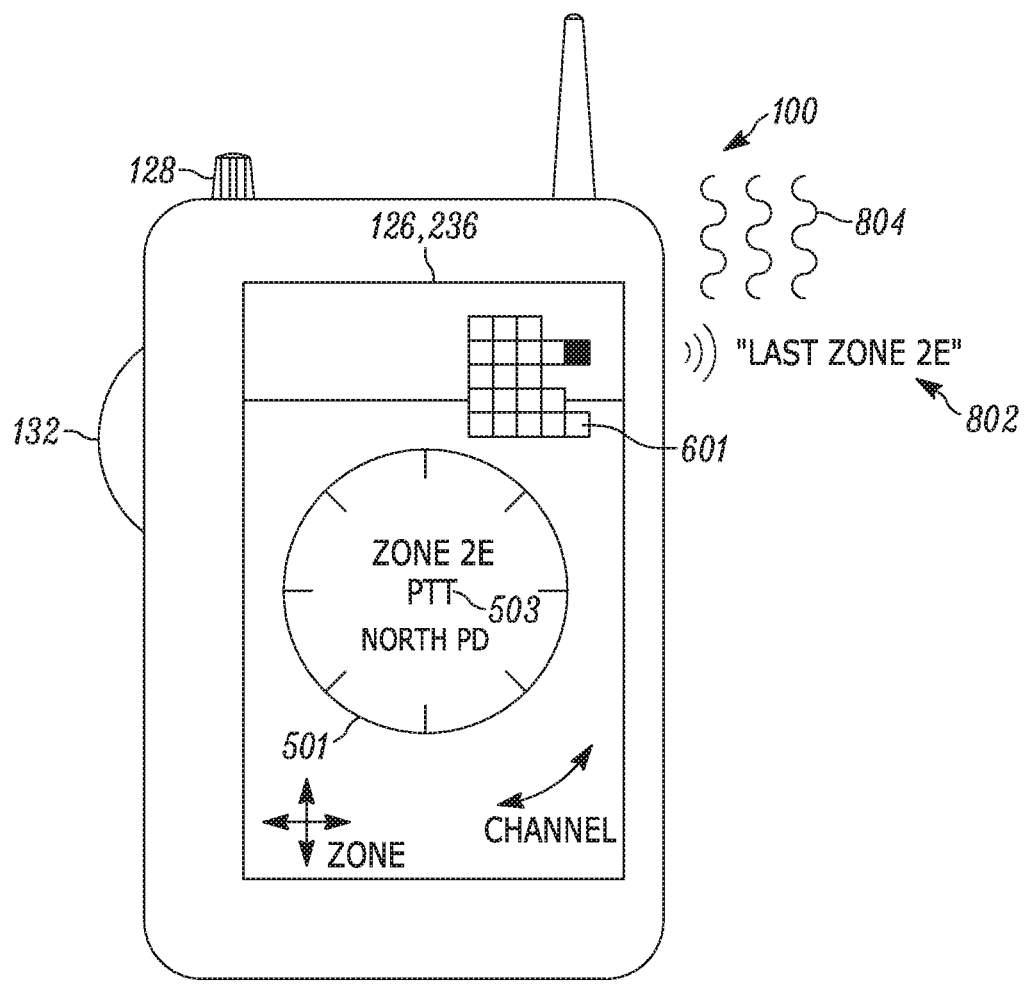
FIG. 8 is a front perspective view of the device of FIG. 1 during further implementation of multi-dimensional zone selection, and showing a haptic indication of an electric-stop at a last zone in a row, in accordance with some implementations.

Attention is next directed to FIG. 8 which depicts the device 100 after receipt of the navigational input 705 or the navigational input 707 and/or after navigation to Zone 2E occurs (e.g. upon receipt of the navigational input 705 or the navigational input 707).

In particular, Zone 2E is indicated at the display 126 as being a selected zone and/or a zone from which a respective communication channel can be selected; and hence specifically one of the respective subset of communication channels is selectable using the circular arrangement 501 and the interior 503 of the circular arrangement 501. Furthermore, the area of the representation 601 of the two-dimensional matrix 203 corresponding to Zone 2E is black, while the remaining areas are white. As navigation to Zone 2E has occurred, aural feedback 802 is provided indicating "Zone 2E". Furthermore, as Zone 2E is the last zone in the current row, the aural feedback 802 includes an indication of such as the phrase "LAST Zone 2E", and the like. Alternately, aural feedback 802 includes "Zone 2E" and/or a tone sequence indicative of reaching one or more of: a last respective zone of one or more of a row and a column of the two-dimensional matrix 203; and an edge of the two-dimensional matrix 203.

Furthermore, FIG. 8 depicts haptic feedback 804 being provided during navigation of the two-dimensional matrix 203 in response to reaching a last respective zone of one or more of a row and a column of the two-dimensional matrix 203. In other words, as navigation to the Zone 2E has occurred, and as Zone 2E is a last zone of the second row, and/or as Zone 2E is at the edge of the two-dimensional matrix 203, the haptic device 244 is controlled to cause the device 100 to vibrate according to a pattern indicative of reaching one or more of: a last respective zone of one or more of a row and a column of the two-dimensional matrix 203; and an edge of the two-dimensional matrix 203. Such a pattern is different from patterns provided by the haptic device 244 in response to changing zones, and the like.

The haptic feedback 804 is further indicative of an "electric-stop" during navigation of the two-dimensional matrix 203. Indeed, some implementations, it is appreciated that the haptic feedback 804, indicative of an electric-stop, is provided when navigation to a last zone of a row or column occurs in a direction of the navigation, and/or when an edge of the two-dimensional matrix 203 is reached. In other words, a last zone of a row or column can include a leftmost zone in a row, a rightmost zone in row, a top zone in a column and/or a bottom zone in a column. The term "electric-stop", as used herein is analogous to a "hard-stop" used with a physical rotary knob which cannot freely rotate past a given point of rotation as there is a mechanical stop present. Accordingly, an electric-stop described herein simulates hard-stop functionality.

For example, when navigation to a last zone of a row or column occurs in a direction of navigation, the haptic feedback 804 is provided, indicative that it is not possible to navigate further in a given direction in the row or column. Indeed, in some implementations, quick navigation to an end of a row or column occurs using the navigational input 705 or the navigational input 707 to assist a user with determining a location in the two-dimensional matrix 203, in conjunction with the haptic feedback 804 indicative of an electric-stop. For example, in an emergency situation, a user may wish to quickly navigate to a first zone in the first row and first column; using a two-finger leftward horizontal swipe the user navigates to the zone at the leftmost column in a current row, and using a two-finger upward vertical swipe the user navigates to the zone in topmost row in the leftmost column (or vice versa). The haptic feedback 804 is provided when the last zone is reached in each of the current row and the leftmost column, indicating to the user, without the user having to refer to the display 126 or having to listen to aural feedback, that a last zone has been reached and/or that an edge of the two-dimensional matrix 203 has been reached. From the last zone in a row or column (and/or the leftmost zone in the top row), the user can then navigate further having located a known position in the two-dimensional matrix 203.

Returning to the example of FIG. 8, as navigation to Zone 2E has occurred, no further navigational input is received. Rather attention next directed to FIG. 9 and FIG. 10 which depicts receipt of selection input (e.g. at block 404 of method 400) indicating a selected communication channel of the respective subset of the one or more communication channels indicated within the selected zone (e.g. Zone 2E).

Figure 9:
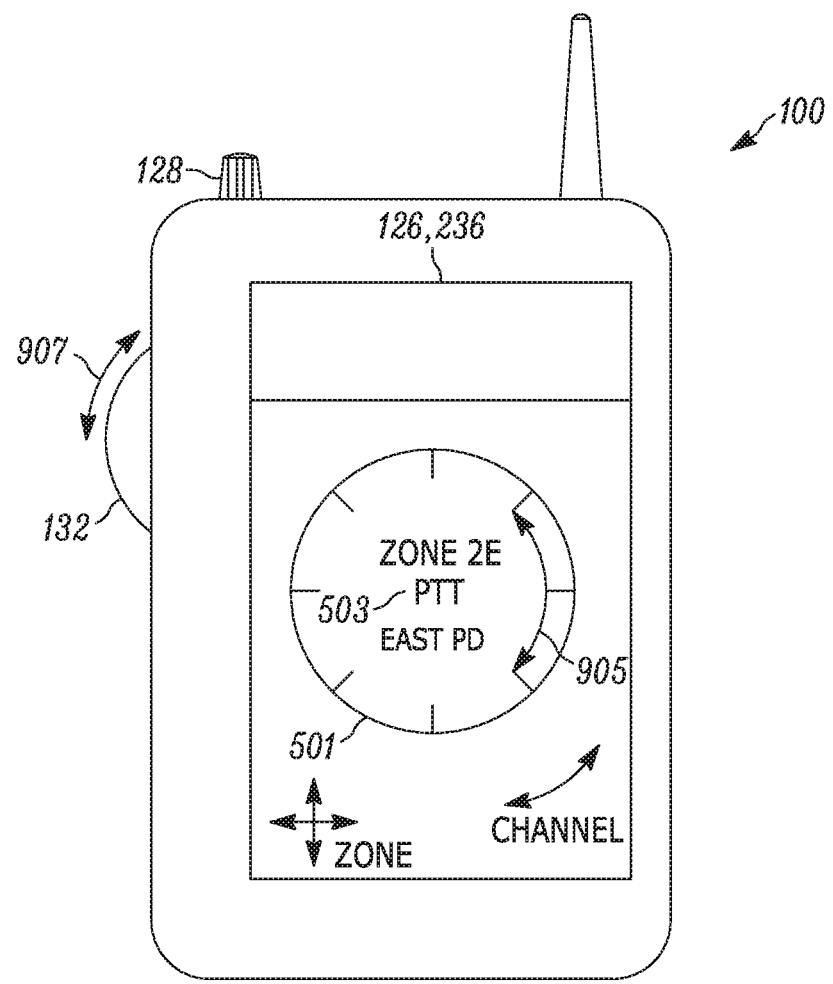
FIG. 9 is a front perspective view of the device of FIG. 1 showing receipt of rotational selection input of a communication channel, in accordance with some implementations.

For example, with reference to FIG. 9, the selection input comprises: a rotational input 905 to navigate the circular arrangement 501. In particular, the rotational input 905 comprises rotational touch input received at the touch interface 236 around the circular arrangement 501. Indeed, receipt of the rotational input 905 causes the device 100 to enter a channel selection mode. As the rotational input 905 is received, the textual indications of the respective communication channels are scrolled through at the interior 503 in a sequence (e.g. in clockwise or counterclockwise manner, in a same direction as the rotational input 905), starting, for example, from the a first associated communication channel of the selected Zone 2E (e.g. as indicated in FIG. 3). As depicted, the textual indication of the communication channel in the interior 503 has changed from "North PD", in FIG. 8, to "East PD", \indicating that the communication channel "East PD" is available for selection.

Alternatively, as also depicted in FIG. 9, the selection input comprises: a rotational input 907 to navigate the circular arrangement 501 received at the wheel 132, which is configured to rotate about an axis and/or has a touch sensitive outer surface. Either way, the rotational input 907 is alternatively used to indicate that the communication channel "East PD" is to be selected.

Figure 10:
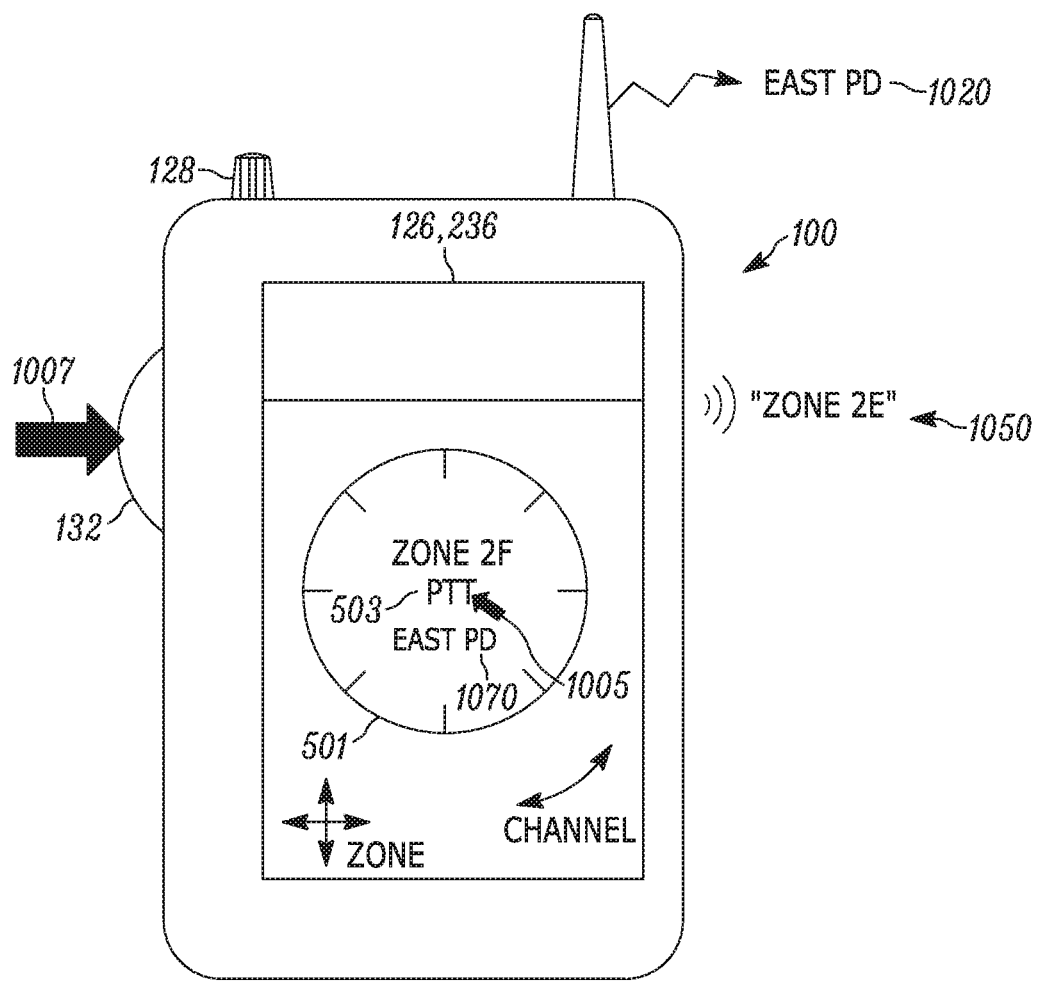
FIG. 10 is a front perspective view of the device of FIG. 1 showing channel selection and communication over the selected communication channel, in accordance with some implementations.

With reference to FIG. 10, the selection input further comprises press input 1005 in the interior 503 of the circular arrangement 501 to indicate the selected communication channel. Alternatively, the selection input further comprises press input 1007 at the wheel 132; in these implementations, it is assumed that wheel 132 is depressable into the interior of the device 100 to receive press input 1005. Either of the press input 1005 or the press input 1007 indicates a selection of the highlighted communication channel "East PD".

In other words, once the "East PD" textual indication is selected and/or rendered at the display 126 using the rotational input 905 and/or the rotational input 907, press input 1005 is received at the interior 503 (e.g. at the text "PTT"), and/or press input 1007 is received at the wheel 132, to select the communication channel corresponding to "East PD", which causes (e.g. at block 406 of method 400) the radio transceiver 201 to communicate over the selected communication channel, as indicated by a transmission 1020 from the antenna 127. Furthermore, in some implementations, as depicted, an aural indication 1050 of the selected communication channel is provided at the device 100, for example using the speaker 242. In some implementations, as depicted, the display 126 is controlled to render a textual indication 1070 of the selected communication channel in the interior 503.

Either way, as depicted a push-to-talk communication session is initiated using the communication channel indicated by "East PD". Furthermore, navigation to a zone that indicates the communication channel indicated by "East PD" can occur quicker than if Zone 1A, Zone 1B, Zone 1C, Zone 2A, Zone 2B, Zone 2C, and Zone 2D were arranged in one-dimensional list and/or selectable using a switch.

Figure 11:
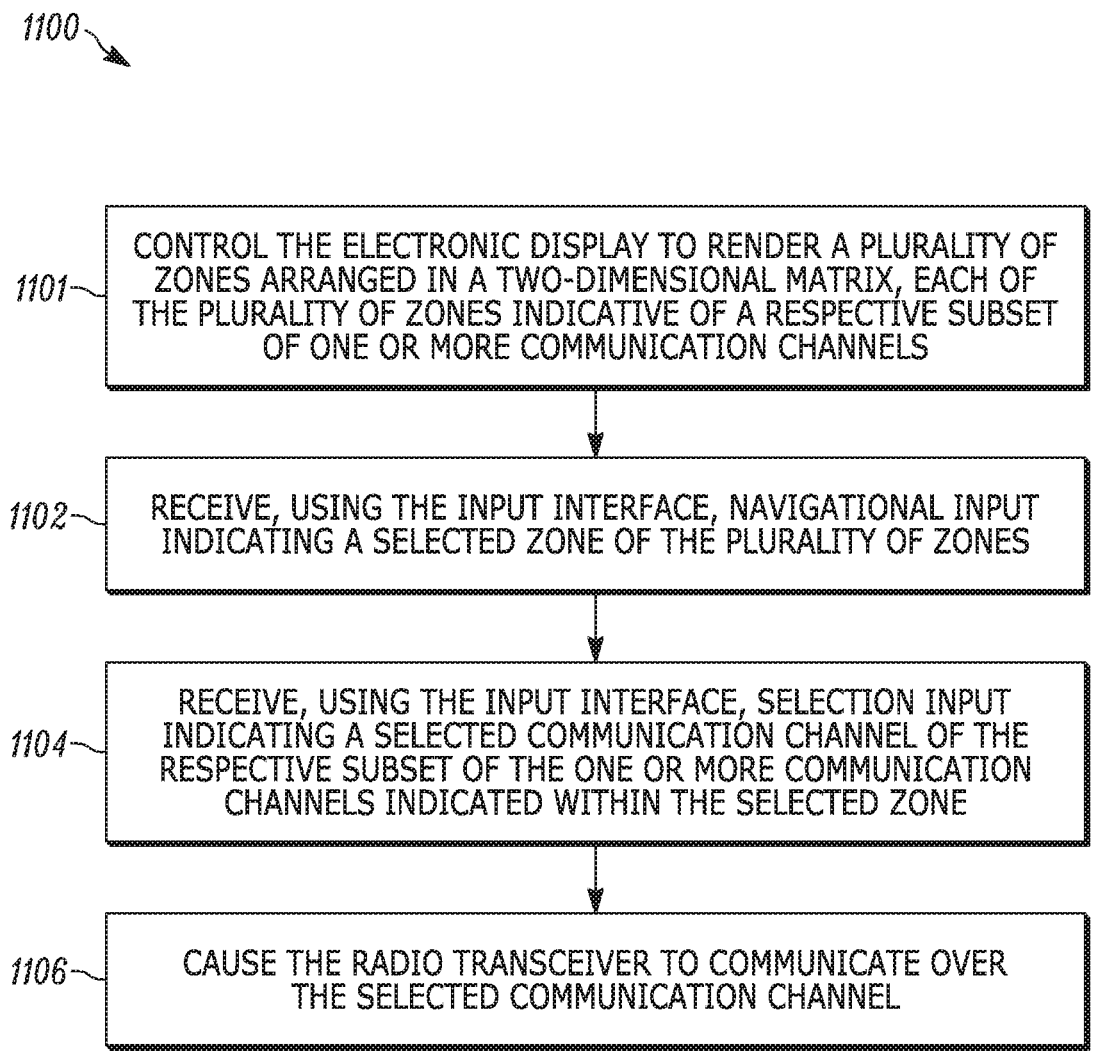
FIG. 11 is a flowchart of a further method for multi-dimensional zone selection in accordance with some alternative implementations.

Attention is now directed to FIG. 11 which depicts a flowchart representative of an alternative method 1100 for multi-dimensional zone selection of the device 100. The operations of the method 1100 of FIG. 11 correspond to machine readable instructions that are executed by, for example, the device 100 of FIG. 2, and specifically by the controller 220 of the device 100. In the illustrated example, the instructions represented by the blocks of FIG. 11 are stored at the memory 202, for example, as a further portion of the application 253. The method 1100 of FIG. 11 is one way in which the controller 220 and/or the device 100 is configured. Furthermore, the following discussion of the method 1100 of FIG. 11 will lead to a further understanding of the device 100, and its various components. However, it is to be understood that the device 100 and/or the method 1100 may be varied, and need not work exactly as discussed herein in conjunction with each other, and that such variations are within the scope of present implementations.

The method 1100 of FIG. 11 need not be performed in the exact sequence as shown and likewise various blocks may be performed in parallel rather than in sequence. Accordingly, the elements of method 1100 are referred to herein as "blocks" rather than "steps." The method 1100 of FIG. 11 may be implemented on variations of the device 100 of FIG. 2, as well.

As will become apparent, it is further appreciated that the method 1100 represents a subset of the method 400, for example, when navigation of the two-dimensional matrix 203 includes rendering of the representation 601 of the two-dimensional matrix 203 represents a special case of the method 400.

At block 1101, the controller 220 controls the electronic display 126 to render a plurality of zones arranged in the two-dimensional matrix 203, each of the plurality of zones indicative of a respective subset of one or more communication channels.

At block 1102, the controller 220 receives, using the input interface 205, navigational input to navigate the two-dimensional matrix 203 to indicate a selected zone of the plurality of zones. The block 1102 is hence similar to block 402 of the method 400.

At block 1104, the controller 220 receives, using the input interface 205, selection input indicating a selected communication channel of the respective subset of the one or more communication channels indicated within the selected zone. The block 1104 is hence similar to block 404 of the method 400.

At block 1106, the controller 220 causes the radio transceiver 201 to communicate over the selected communication channel. The block 1106 is hence similar to block 406 of the method 400.

Indeed, the method 1100 is similar to the method 400, however the method 1100 includes the controller 220 controlling the electronic display 126 to render the two-dimensional matrix 203, for example as the representation 601. Hence, in these implementations, the representation 601 is provided at the display 126 whenever navigation of the two-dimensional matrix 203 occurs. However, in method 400, the representation 601 is optional.

In the foregoing specification, specific implementations have been described. However, one of ordinary skill in the art appreciates that various modifications and changes can be made without departing from the scope of the invention. For example, while specific types of navigational input and selection input have been described, other types of navigational input and selection input are within the scope of present implementations. For example, in other implementations, a two-finger swipe is used to navigate to a next zone in the two-dimensional matrix 203, while a double-swipe is used to navigate to a last zone of a row or column in the two-dimensional matrix 203.

Furthermore, while the selection input for selecting a channel is described as a combination of rotational input and press input, in other implementations, a first type of swipe input is used to select a zone a second type of swipe input is used to select a channel. For example, in some implementations, two-finger swipe input is used to select a zone when navigating the two-dimensional matrix 203, and one-finger swipe input is used to select a channel (or vice versa).

In addition, while horizontal and vertical touch input is described for navigating the two-dimensional matrix 203, in yet further implementations, diagonal input received, for example to navigate from Zone 1A to Zone 2B in one swipe.

Figure 12:
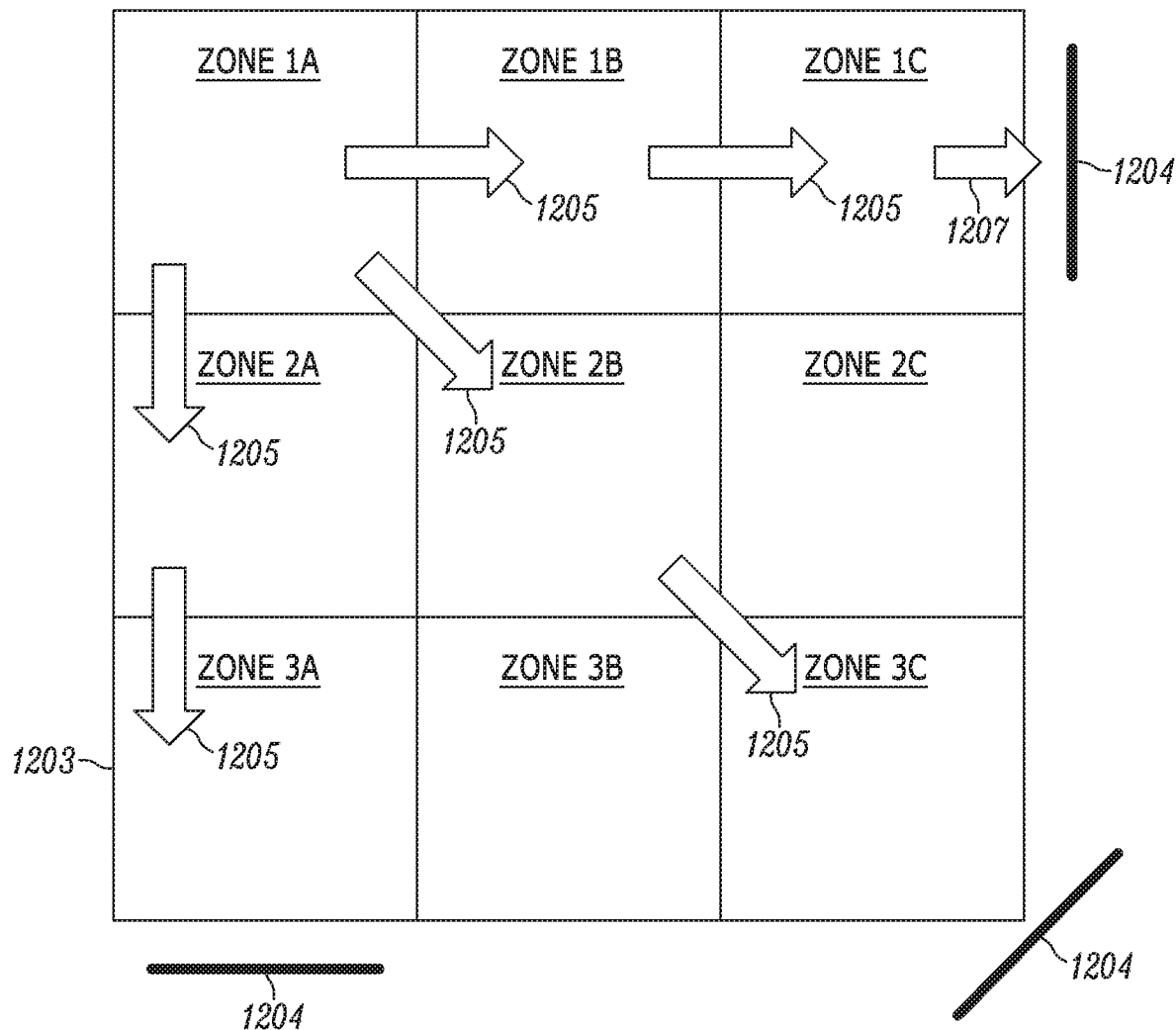
FIG. 12 is an example of a two-dimensional matrix of zones, and navigation thereof, in accordance with some alternative implementations.

For example, attention is next directed to FIG. 12 which depicts a two-dimensional matrix 1203, similar to the two-dimensional matrix 203, but having three rows and three columns (e.g. a 3×3 matrix). FIG. 12 further depicts arrows 1205 corresponding to touch input and/or swipe input received at the touch interface 236 of the display 126 (and/or corresponding to input received at one or more auxiliary controls 128) for navigating the two-dimensional matrix 1203. In other words, while the two-dimensional matrix 1203 is not necessarily rendered at the display 126, navigating thereof occurs via input corresponding to arrows 1205. From FIG. 12 it is apparent that the horizontal and vertical arrows 1205 are similar to the navigational input described with reference to FIG. 5 to FIG. 7. However, input corresponding to the diagonal arrows 1205 from Zone 1A to Zone 2B, and from Zone 2B to Zone 3C is used to navigate the two-dimensional matrix 1203 diagonally.

FIG. 12 further depicts a respective electric-stop 1204 (and/or an electric-stop) adjacent the right of Zone 1C, adjacent below Zone 3A and diagonally adjacent to Zone 3C. Each of the electric-stops 1204 indicate that when navigation occurs to any of Zones 1C, 3A and 3C, an indication of an electric-stop is provided, for example similar to the haptic feedback 804 and/or the aural feedback 802, including when navigation to a respective last zone in a row or column occurs diagonally. In some of these implementations, the respective indication of an electric-stop 1204 occurs only when further navigation in a given direction is not possible. For example, arrow 1207 in FIG. 12 indicates that navigation input is received that attempts to cause navigation to a right of Zone 1C, which cannot occur as there are further zones to the right of Zone 1C; in these implementations, receipt of the navigation input corresponding to arrow 1207 causes an indication of the respective electric-stop 1204 adjacent Zone 1C.

Put another way, the electric-stops 1204, including, but not limited to, the haptic feedback 804 and/or the aural feedback 802, are provided to indicate an edge of the two-dimensional matrix 1203 (and/or the two-dimensional matrix 203).

In yet further implementations, different areas of the display 126 and the touch interface 236 are used to receive input to navigate the two-dimensional matrix 203, and to receive input for selecting a channel. For example, with reference to any of FIG. 5 to FIG. 10, in some implementations, the area above the circular arrangement 501 can be used to receive the navigational input for navigating the two-dimensional matrix 203, for example by receiving the navigational input at the representation 601 of the two-dimensional matrix 203, while the selection input for selecting a communication channel is received at the circular arrangement 501.

Similarly, while a circular arrangement 501 of the respective subset of the one or more communication channels of a selected zone is described, other arrangements are within the scope of present implementations including, but not limited to, lists of the one or more communication channels and the like. Furthermore, while in FIG. 5 to FIG. 10, a textual indication of one communication channel of the respective subset of the one or more communication channels of a selected zone are rendered at the interior 503, in other implementations, textual indication more than one and/or all of the communication channel of the respective subset of the one or more communication channels of a selected zone are is arranged around the outside of the circular arrangement 501. Regardless, the circular arrangement 501 is provided indicating that rotational input is receivable for selecting a communication channel.

Figure 13:
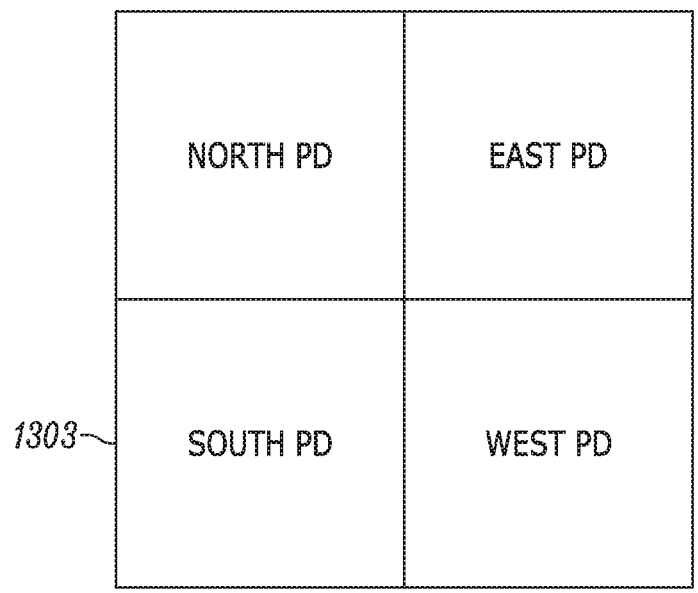
FIG. 13 is an example of a two-dimensional matrix of indications of communication channels, in accordance with some implementations.

In yet further implementations, a two-dimensional matrix structure, similar to that depicted in FIG. 3 is further used to navigate communication channels, for example in a selected zone. For example, attention is next directed to FIG. 13 which depicts, indications of communication channels associated with Zone are arranged in a two-dimensional matrix 1303, which is navigable in a similar manner to two-dimensional matrix 203, for example using touch input, input at buttons and/or knobs, and the like, and/or a combination thereof. Different types of touch input and/or input at buttons and/or knobs, and the like can be used to select a communication channel represented by the two-dimensional matrix 1303 once navigation to a communication channel at a row/channel intersection occurs. For example, navigation to the intersection of a row and column representing "East PD" occurs using touch input and/or input at buttons and/or knobs, and the like. In these implementations, once a zone is selected, the representation 601 can be replaced with a similar representation of a two-dimensional matrix structure of the communication channels (and/or a representation of the two-dimensional matrix 1303 is rendered at the display 126 instead of the circular arrangement 501), and navigation of the two-dimensional matrix 1303 occurs to select a communication channel. As described above, additional selection input can be received to initiate communications over a selected communication channel, for example at a region of the display 126 similar the "PTT" region in each of FIG. 5 to FIG. 10. In yet further implementations, a subset of the available communication channels, including but not limited to, all of the available communication channels are provided in a two-dimensional matrix, similar to those depicted in FIG. 3 and FIG. 13, and navigation to a communication channel includes receiving, using the input interface 205, navigational input indicating a selected communication channel of one or more communication channels indicated in a two-dimensional matrix. Such implementations can alternatively include rendering a representation of the two-dimensional matrix of communication channels at the display 126. Furthermore, in some of these implementations, receiving, using the input interface 205, navigational input indicating a selected communication channel of one or more communication channels indicated in a two-dimensional matrix occurs without the communication channels being arranged into zone and/or without zone selection.

Provided herein is a method and communication device with multidimensional zone selection. In particular, by arranging zones in a two-dimensional matrix, navigation to a particular zone can be achieved faster than when the zones are accessed using a simple list and/or a toggle switch. Furthermore, such multidimensional zone selection can provide greater flexibility in grouping zones. In addition, the use of non-visual feedback, such as aural feedback and/or haptic feedback, when navigating the two-dimensional matrix can allow for zone and channel selection without visually accessing a display of the communication device. Furthermore, distinct gestures and/or distinct touch input and/or distinct input at knobs, buttons etc. are used to select a zone, select a channel, and to initiate communications over a selected channel (including, but not limited to, push-to-talk communications), which can prevent inadvertent actuation of, for example, channel selection, can further facilitate operation eyes-free operation of the device described herein.

In the foregoing specification, specific implementations have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

It is understood that for the purpose of this document, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having", "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting implementation the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some implementations may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an implementation can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

I claim:

1. A communication device comprising:
a radio transceiver;
an electronic display;
an input interface comprising a touch interface; and
a controller communicatively coupled to the radio transceiver, the electronic display, and the input interface, the controller configured to:
control the electronic display to render indications of groups of communication channels, the indications arranged in a two-dimensional matrix, each group of a respective indication comprising a respective subset of one or more of the communication channels;
receive, using the input interface, navigational input indicating a selected indication of the indications, the navigational input comprising one or more swipe inputs in one or more of a horizontal, vertical, and diagonal direction indicative of a direction of navigation within the two-dimensional matrix to indicate the selected indication, which further indicates a selected group of the one or more communication channels;
upon receipt of the navigational input, control the electronic display to render a circular arrangement of the selected group of the one or more communication channels indicated by the selected indication, and an interior of the circular arrangement configured to receive a press input to indicate a selected communication channel;
receive, using the input interface, selection input indicating the selected communication channel of the selected group of the one or more communication channels indicated within the selected indication, the selection input comprising: a rotational input to navigate the circular arrangement; and the press input received in the interior of the circular arrangement to indicate the selected communication channel; and
cause the radio transceiver to communicate over the selected communication channel.

2. The communication device of claim 1, further comprising a haptic device configured to provide haptic feedback during navigation of the two-dimensional matrix in response to reaching one or more of: an edge of the two-dimensional matrix; and a last respective indication of one or more of a row and a column of the two-dimensional matrix.

3. The communication device of claim 1, wherein one or more of rows and columns of the two-dimensional matrix are of varying lengths.

4. A method comprising:
at communication device comprising: a radio transceiver; an electronic display; an input interface comprising a touch interface; and a controller communicatively coupled to the radio transceiver, electronic display, and input interface, controlling, using the controller, the electronic display to render indications of groups of communication channels, the indications arranged in a two-dimensional matrix, each group of a respective indication comprising a respective subset of one or more of the communication channels, the respective subset of the one or more communication channels of one or more of the indications being configurable upon receipt of input at the input interface;
receiving, at the controller, using the input interface, navigational input indicating a selected indication of the indications, the navigational input comprising one or more swipe inputs in one or more of a horizontal, vertical, and diagonal direction indicative of a direction of navigation within the two-dimensional matrix to indicate the selected indication which further indicates a selected group of the one or more communication channels;
upon receipt of the navigational input, controlling the electronic display to render a circular arrangement of the selected group of the one or more communication channels indicated by the selected indication, and an interior of the circular arrangement configured to receive a press input to indicate a selected communication channel;
receiving, at the controller, using the input interface, selection input indicating the selected communication channel of the respective subset of the one or more communication channels indicated by the selected indication, the selection input comprising: a rotational input to navigate the circular arrangement; and the press input received in the interior of the circular arrangement to indicate the selected communication channel; and
causing, using the controller, the radio transceiver to communicate over the selected communication channel.

5. A communication device comprising:
a radio transceiver;
a memory storing indications of groups of communication channels, the indications arranged in a two-dimensional matrix, each group of a respective indication comprising a respective subset of one or more of the communication channels;
an input interface comprising a touch interface; and,
a controller configured to:
receive, using the input interface, navigational input to navigate the two-dimensional matrix to indicate a selected indication of the indications, which further indicates a selected group of the one or more communication channels, the navigational input comprising a first type of touch input;
receive, using the input interface, selection input indicating a selected communication channel of the selected group of the one or more communication channels indicated within the selected indication, the selection input comprising a second type of touch input different from the first type of touch input; and
cause the radio transceiver to communicate over the selected communication channel.

6. The communication device of claim 5, further comprising a feedback device configured to provide feedback during navigation of the two-dimensional matrix in response to one or more of: changing between indications; and the selected indication being selected.

7. The communication device of claim 5, further comprising a haptic device configured to provide haptic feedback during navigation of the two-dimensional matrix in response to reaching one or more of: an edge of the two-dimensional matrix; and a last respective indication of one or more of a row and a column of the two-dimensional matrix.

8. The communication device of claim 5, wherein the input interface includes a touch electronic display, and the navigational input includes touch input at the touch electronic display.

9. The communication device of claim 5, wherein the input interface includes a touch electronic display, and the navigational input includes a plurality of touch inputs at the touch electronic display.

10. The communication device of claim 5, wherein the input interface includes a touch electronic display, and the navigational input includes touch input indicative of navigation to a last respective indication of one or more of a row and a column of the two-dimensional matrix.

11. The communication device of claim 5, wherein one or more of rows and columns of the two-dimensional matrix are of varying lengths.

12. The communication device of claim 5, further comprising an electronic display configured to render a representation of the two-dimensional matrix and a position of the selected indication in the two-dimensional matrix.

13. The communication device of claim 5, further comprising an electronic display configured to render a representation of the selected indication.

14. A method comprising:
at a communication device comprising: radio transceiver; a memory storing indications of groups of communication channels, the indications arranged in a two-dimensional matrix, each group of a respective indication comprising a respective subset of one or more of the communication channels; an input interface comprising a touch interface; and, a controller, receiving, at the controller, using the input interface, navigational input to navigate the two-dimensional matrix to indicate a selected indication of the indications, which further indicates a selected group of the one or more communication channels, the navigational input comprising a first type of touch input;
receiving, at the controller, using the input interface, selection input indicating a selected communication channel of the selected group of the one or more communication channels indicated by the selected indication, the selection input comprising a second type of touch input different from the first type of touch input; and
causing, using the controller, the radio transceiver to communicate over the selected communication channel.

* * * * *